United States Patent
Hoegh et al.

(10) Patent No.: US 11,714,023 B2
(45) Date of Patent: Aug. 1, 2023

(54) METHOD OF MONITORING THE STRUCTURAL INTEGRITY OF THE SUPPORTING STRUCTURE OF A WIND TURBINE

(71) Applicant: Siemens Gamesa Renewable Energy A/S, Brande (DK)

(72) Inventors: Gustav Hoegh, Vejle (DK); Dennis Stachniuk Jensen, Brande (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 78 days.

(21) Appl. No.: 16/868,580

(22) Filed: May 7, 2020

(65) Prior Publication Data

US 2020/0363286 A1 Nov. 19, 2020

(30) Foreign Application Priority Data

May 16, 2019 (EP) .................................... 19174859

(51) Int. Cl.
*G01M 5/00* (2006.01)
*F03D 17/00* (2016.01)
(Continued)

(52) U.S. Cl.
CPC .......... *G01M 5/0025* (2013.01); *F03D 17/00* (2016.05); *G01P 15/18* (2013.01); *G08B 21/182* (2013.01)

(58) Field of Classification Search
CPC ...... G01M 5/0025; F03D 17/00; F03D 13/20; G01P 15/18; G08B 21/182; Y02E 10/72;
(Continued)

(56) References Cited

U.S. PATENT DOCUMENTS 5,758,543 A * 6/1998 Bair .................. F16H 59/04
74/473.1
9,062,653 B2 * 6/2015 Brath .................. F03D 7/042
(Continued)

FOREIGN PATENT DOCUMENTS

CN 107829884 A 3/2018
EP 1674724 A2 6/2006
(Continued)

OTHER PUBLICATIONS

Communication Pursuant to Article 94(3) EPC dated Aug. 20, 2021 for Application No. 19 174 859.9.
(Continued)

*Primary Examiner* — Lee E Rodak
*Assistant Examiner* — Sangkyung Lee
(74) *Attorney, Agent, or Firm* — Schmeiser, Olsen & Watts LLP

(57) ABSTRACT

Provided is a method of monitoring the structural integrity of a supporting structure of a wind turbine, which method includes the steps of determining a fore-aft tower oscillation frequency; determining a side-to-side tower oscillation frequency; computing a working structural indicator value from the fore-aft tower oscillation frequency and the side-to-side tower oscillation frequency; comparing the working structural indicator value to a reference working structural indicator value; and issuing an alarm if the difference between the working structural indicator value and the reference structural indicator value exceeds a predefined threshold. Also provided is a system for monitoring the structural integrity of a supporting structure of a wind turbine, a wind turbine, and a computer program product for carrying out the steps of the inventive method.

13 Claims, 3 Drawing Sheets

(51) Int. Cl.
*G01P 15/18* (2013.01)
*G08B 21/18* (2006.01)

(58) Field of Classification Search
CPC ............ Y02E 10/728; F05B 2260/966; F05B 2270/334; F05B 2270/807; G01H 17/00
See application file for complete search history.

(56) References Cited

U.S. PATENT DOCUMENTS

| | | | |
|---|---|---|---|
| 10,273,939 B2 * | 4/2019 | Baun | F03D 7/0296 |
| 10,907,617 B2 * | 2/2021 | Caponetti | F03D 7/0204 |
| 2009/0180875 A1 | 7/2009 | Egedal et al. | |

FOREIGN PATENT DOCUMENTS

| | | |
|---|---|---|
| EP | 2103915 A1 | 9/2009 |
| EP | 3080446 A1 | 10/2016 |
| WO | WO 2018001432 A1 | 1/2018 |
| WO | WO-2018171852 A1 * 9/2018 ............. F03D 17/00 |  |

OTHER PUBLICATIONS

European Search Report dated Nov. 8, 2019 for Application No. 19174859.9.
Devriendt, Christof et al: "Structural health monitoring of offshore wind turbines using automated operational modal analysis"; SHM. Structural Health Monitoring; vol. 13; No. 6; Nov. 1, 2014; pp. 644-659; XP055898331; GB; ISSN: 1475-9217; DOI: 10.1177/1475921714556568; URL: http://journals.sagepub.com/doi/full-xml/10.1177/1475921714556568; 2014.

* cited by examiner

METHOD OF MONITORING THE STRUCTURAL INTEGRITY OF THE SUPPORTING STRUCTURE OF A WIND TURBINE

CROSS-REFERENCE TO RELATED APPLICATIONS

This application claims priority to European Application No. 19174859.9, having a filing date of May 16, 2019, the entire contents of which are hereby incorporated by reference.

FIELD OF TECHNOLOGY

The following describes a method of monitoring the structural integrity of a supporting structure of a wind turbine, and a system for monitoring the structural integrity of the supporting structure of a wind turbine.

BACKGROUND

Wind acting on the aerodynamic rotor and nacelle of a wind turbine will cause the entire structure—including the tower—to sway back and forth relative to a fixed base. The supporting structure of a wind turbine comprises the tower and the foundation that anchors the entire structure to the ground. The frequency of oscillation of the tower is determined by various factors, primarily by the tower height and the mass of the overall structure. The oscillation direction is determined by various factors, primarily by the wind direction. In the case of an offshore wind turbine, the oscillation direction may also be influenced by the direction of water currents, which can move in a different direction to the wind. The large capacity wind turbines presently being constructed may have very long rotor blades (80 m or more in length), requiring correspondingly taller towers. When such a tall tower oscillates, the displacement of the upper end of the tower may be in the order of several meters.

The tower of a wind turbine—regardless of its height—must be constructed to withstand the stresses arising during tower oscillation. Sufficient tower strength may be achieved by a combination of design parameters such as tower wall thickness, flange thickness, tower section height, foundation size, etc. However, if a crack develops in the tower, it must be detected early in order to avoid catastrophic failure of the tower. To this end, it is known to monitor a tower oscillation frequency (or simply "tower frequency"). After installation of a wind turbine, its tower frequency can be measured and stored as a reference. During the lifetime of the wind turbine, its tower frequency can be compared to this reference frequency. A significant difference between reference frequency and observed frequency would indicate damage to the tower structure. If the difference exceeds a certain threshold, the wind turbine controller could initiate shutdown of the wind turbine.

The conventional art approach has been shown to work well for any wind turbine that is mounted on a stable foundation. For example, the ground upon which onshore turbines are constructed will not be subject to change over time. The known approach is also suited to offshore wind turbines on stable seabed conditions, for example in the North Sea. However, wind turbines are being installed in many different locations, some of which do not enjoy these long-term stable conditions. It is possible that the ground upon which a wind turbine is installed may change, for example due to morphological changes in the seabed, to soil liquefaction after a storm, scour effects that expose more of the foundation, etc. Such alterations in the underlying support may result in a change in the effective height of the supporting structure of the wind turbine, making it slightly shorter or slightly longer. Even a small alteration in length will affect the tower frequency, so that an alarm may be triggered even though the tower and foundation are structurally sound. This can result in significant downtime and reduction in annual energy production (AEP) while efforts are made to detect non-existent damage. It would be possible to raise the alarm threshold to avoid false alarms arising from changes to the underlying ground, but this brings with it the risk that an actual crack goes unnoticed until it is too late to safely react, and the costs arising from severe damage outweigh any possible benefit.

SUMMARY

An aspect relates to an improved way of monitoring the structural integrity of a wind turbine tower.

According to embodiments of the invention, the method of monitoring the structural integrity of the supporting structure of a wind turbine comprises the steps of determining a fore-aft tower oscillation frequency; determining a side-to-side tower oscillation frequency; computing a working structural indicator value from the fore-aft tower oscillation frequency and the side-to-side tower oscillation frequency; comparing the working structural indicator value to a reference structural indicator value; and reporting a fault signal if the difference between the working structural indicator value and the reference structural indicator value exceeds a predefined threshold.

In the context of embodiments of the invention, it shall be understood that the working structural indicator value is computed during normal operation or working of the wind turbine. The working structural indicator value can be computed on a regular basis, for example once a week, once a day, etc., throughout the lifetime of the wind turbine. Computation of the working structural indicator value can be followed by the comparison to the reference structural indicator value. It shall be understood that the reference structural indicator value need only be computed once, for example immediately following the commissioning of the wind turbine.

An advantage of the inventive method is that the structural integrity of the supporting structure can be monitored in a favorably straightforward manner. It is relatively uncomplicated to determine the fore-aft and side-to-side tower oscillation frequencies, so that the information required to compute a working structural indicator value can be easily obtained. The reference structural indicator value can be computed in the same manner as the working structural indicator value, as will be explained below. The working structural indicator value can therefore be regarded as a current indicator of the structural health or "soundness" of the wind turbine tower.

According to embodiments of the invention, the system for monitoring the structural integrity of the supporting structure of a wind turbine comprises a frequency determination module configured to determine a fore-aft tower oscillation frequency; a frequency determination module configured to determine a side-to-side tower oscillation frequency; a structural indicator value computation module configured to compute a working structural indicator value from the fore-aft tower oscillation frequency and the side-to-side tower oscillation frequency; a comparator module configured to compare the working structural indicator value with a reference oscillation value; and a fault report module configured to issue a fault report signal if the difference between the working structural indicator value and the reference structural indicator value exceeds a predefined threshold.

Advantageously, the inventive system does not require any significant adaptation of the existing structure or control arrangement. With relatively little effort, an existing control environment can be adapted to also accommodate features of the inventive system.

According to embodiments of the invention, the wind turbine comprises a supporting structure, namely a tower anchored to the ground by means of a foundation; a nacelle mounted on top of the tower by means of a yaw assembly; an aerodynamic rotor rotatably mounted to the rotor of a generator installed in the nacelle; and a system for monitoring the structural integrity of the supporting structure using the inventive method.

According to embodiments of the invention, a computer program product (non-transitory computer readable storage medium having instructions, which when executed by a processor, perform actions) is configured to carry out the steps of the inventive method when the computer program product is loaded into a memory of a programmable device, for example a remote or local control unit of a wind turbine.

The units or modules of the inventive system mentioned above, e.g. the frequency determination modules, the structural indicator value computation module, the comparator module etc., can be completely or partially realized as software modules running on a processor of a control unit, which can be realized locally (i.e. present in the wind turbine) or remotely (e.g. in a wind park control environment). A realization largely in the form of software modules can have the advantage that applications already installed on an existing system can be updated, with relatively little effort, to install and run the inventive method.

Particularly advantageous embodiments and features of embodiments of the invention are given by the dependent claims, as revealed in the following description. Features of different claim categories may be combined as appropriate to give further embodiments not described herein.

The supporting structure shall be understood to comprise the wind turbine tower as well as the foundation that anchors the tower to the ground. A foundation can be a concrete foundation, a monopile or tripod foundation, a jacket foundation, etc. Usually, a significant portion of the foundation is embedded in the ground, for example under the seabed. A tower oscillation frequency is determined by the total length of the exposed tower and foundation above ground (or seabed) level.

The fore-aft direction may be interpreted as it would apply in an aeronautical sense, so that "fore" in the context of a wind turbine is generally understood to mean "facing into the wind". Since the yaw system of a wind turbine is generally operated to track the wind, i.e. to turn the hub or nose of the wind turbine into the wind, it may be assumed in the following that the "fore-aft axis" of the nacelle is parallel to the axis of rotation of the aerodynamic rotor. The "side-to-side axis" of the nacelle may be understood to intersect the "fore-aft axis" at a right angle. The fore-aft axis and the side-to-side axis may each be understood to bisect the yaw ring at the top of the tower.

In the following, without restricting embodiments of the invention in any way, it may be assumed that the wind turbine has a yaw assembly structure to which several yaw drive units are mounted. These are generally realized as pinion drives that engage with a toothed yaw ring at the upper tower level. When the yaw drive units are operated, they collectively act to yaw the nacelle (and therefore the aerodynamic rotor) by a desired amount.

The spatial displacement of the upper level of the wind turbine tower can be tracked in any suitable manner, using any suitable arrangement of sensors. In embodiments of the invention, the system comprises a number of accelerometers arranged on the fore-aft axis of the nacelle, and a number of accelerometers arranged on the side-to-side axis of the nacelle. These accelerometers can be mounted on the yaw assembly structure of the nacelle. For example, one or two accelerometers may be attached to the yaw assembly structure on each side of the yaw ring in the fore-aft direction. Similarly, one or two accelerometers may be attached to the yaw assembly structure on each side of the yaw ring in the side-to-side direction.

In the inventive method, the fore-aft tower oscillation frequency is determined on the basis of data collected by the accelerometer(s) arranged on the fore-aft axis of the wind turbine nacelle. Similarly, the side-to-side tower oscillation frequency is determined on the basis of data collected by the accelerometer(s) arranged on the side-to-side axis of the wind turbine nacelle.

A structural indicator value is a mathematical relationship between the fore-aft tower oscillation frequency and the side-to-side tower oscillation frequency a ratio of fore-aft tower oscillation frequency to side-to-side tower oscillation frequency. Alternatively, the structural indicator value may be the absolute difference between the fore-aft tower oscillation frequency and the side-to-side tower oscillation frequency. Of course, it is possible to compute both kinds of structural indicator value.

The working structural indicator value computed during normal operation of the wind turbine is compared to a reference structural indicator value. As indicated above, the reference structural indicator value is computed in a prior step and is computed in the same manner as the working structural indicator value. The reference structural indicator value is computed over an interval following commissioning of the wind turbine, at which time it can be absolutely certain that the tower is perfectly sound.

During normal operation of the wind turbine, the current or working structural indicator is compared to the reference structural indicator. Even for a perfectly healthy tower structure, the working structural indicator and the reference structural indicator will seldom be exactly identical and may differ by a slight amount within an acceptable tolerance. Similarly, the working structural indicator value of a structurally sound but aging wind turbine tower may be expected to differ from the reference structural indicator value. Therefore, cause for concern may arise only when the working structural indicator value differs from the reference structural indicator value by a significant amount, for example when the working structural indicator value differs from the reference structural indicator value by more than a predefined threshold value or acceptable tolerance range such as 2%-5%. The acceptable threshold is established on the basis of simulations carried out for that type of wind turbine. Alternatively, or in addition, the acceptable threshold may be determined on the basis of operation data collected for comparable wind turbine structures already in the field.

If the working structural indicator value clearly differs from the reference structural indicator value, this would indicate that there is some structural damage to the tower, for example a crack in a tower section. The possibility is reported to an appropriate control unit by issuing the fault report signal. A suitable response may be to shut down the wind turbine until a crew of technicians can visit the site to inspect the tower. Of course, the wind turbine should only be shut down if there is a clear indication that the tower has sustained damage. To ensure that the fault report signal was not triggered by a spurious measurement or an outlier measurement, the controller may respond to the fault report signal by commanding a slow yawing of the nacelle through 360° (under suitable wind conditions) while measuring the fore-aft and side-to-side frequencies and comparing the working structural indicator value with the reference structural indicator value. If the same error is reported, the fault report signal may be considered to be justified, and necessary control commands can be issued to shut down the wind turbine. The step of yawing the nacelle through a large arc or up to 360° while computing structural indicator values can also be used to identify with some precision the location of a tower structure fault. The circumferential position of the fault may be identified to an accuracy of within ±10° degrees, for example. This can save a significant amount of time during the inspection procedure. Of course, the height of the fault between tower base and tower top must then be located during the inspection procedure.

In embodiments of the invention, therefore, a fault verification procedure is carried out following the reporting of a fault signal. A fault verification procedure can involve steps of repeating the measures of fore-aft and side-to-side frequencies at close intervals over a shorter period of time and comparing the results with the previous results. If there is no change, e.g. a significant difference remains between the working structural indicator value and the reference structural indicator value, it may be assumed that the fault report signal was correctly issued. The wind turbine controller can then issue an appropriate alarm. For example, in embodiments of the invention, appropriate wind turbine operation parameters are adjusted—for example to reduce the maximum thrust—as a precaution until the structural integrity of the tower and/or foundation can be inspected. A more drastic response would be to immediately shut down the wind turbine. This may be justified if the difference between the working structural indicator value and the reference structural indicator value is very large.

BRIEF DESCRIPTION

Some of the embodiments will be described in detail, with references to the following Figures, wherein like designations denote like members, wherein.

DETAILED DESCRIPTION

Figure 1:
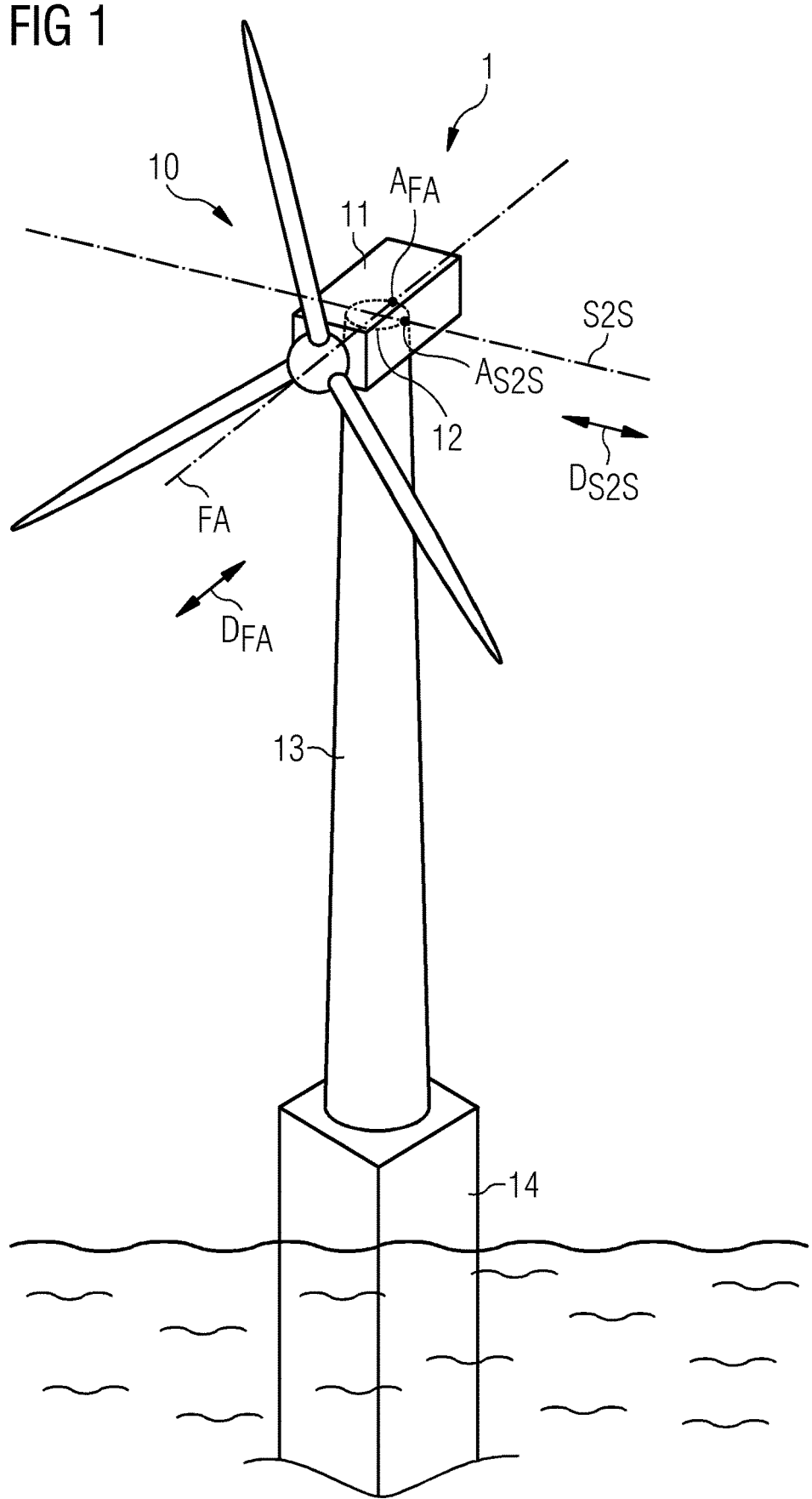
FIG. 1 is a simplified diagram of a wind turbine seen from above.

FIG. 1 is a simplified diagram of an offshore wind turbine 1 seen from above, indicating the aerodynamic rotor 10 (rotor blades mounted to a hub), the nacelle 11, and the position of the nacelle 11 over the tower 13, to which the nacelle 11 is mounted by means of a circular yaw ring 12. The tower 13 is mounted to a foundation 14, which in turn is embedded to a large extent under the seabed. The tower 13 and the foundation 14 collectively act as the supporting structure of the wind turbine 1. To measure tower frequency, a number of accelerometers $A_{FA}, A_{S2S}$ are mounted on the yaw ring. Here, a fore-aft accelerometer $A_{FA}$ is mounted on the fore-aft axis FA of the nacelle 11 and is used to measure tower movement in the corresponding fore-aft direction $D_{FA}$. A side-to-side accelerometer $A_{S2S}$ is mounted on the side-to-side axis S2S of the nacelle 11 and is used to measure tower movement in that side-to-side direction $D_{S2S}$. The positions of the accelerometers $A_{FA}, A_{S2S}$ are fixed relative to the nacelle 11, so that when the wind turbine 1 is yawed to track the wind, the fore-aft direction $D_{FA}$ and side-to-side direction $D_{S2S}$ change with respect to the wind turbine tower 13. Data collected by an accelerometer $A_{FA}, A_{S2S}$ is analyzed to estimate the frequency of the tower oscillation in that direction. For example, the frequency of oscillation can be computed using a suitable Fourier transform technique, as will be known to the skilled person.

Figure 2:
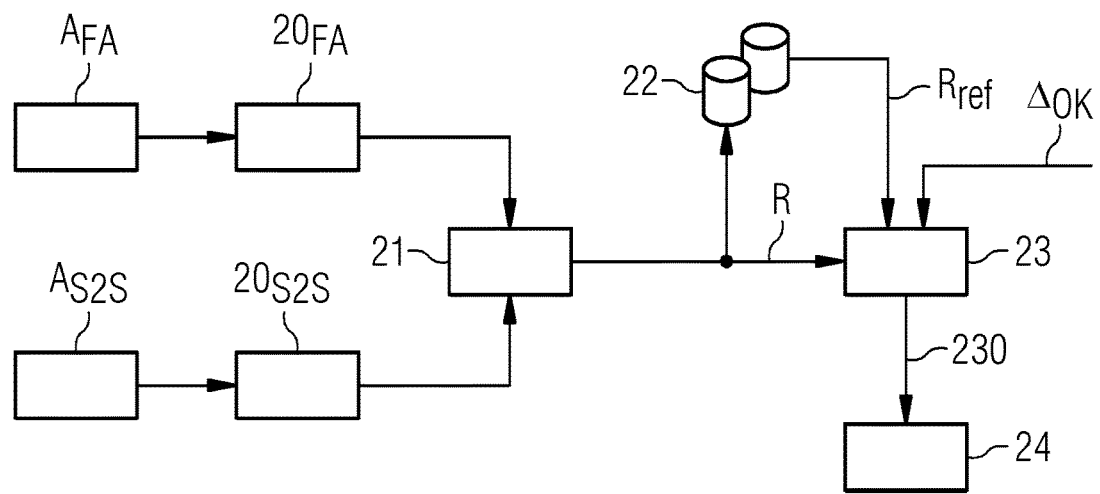
FIG. 2 is a block diagram showing the main steps of the inventive method.

FIG. 2 is a block diagram showing the main steps of the inventive method. After commissioning a wind turbine of the type described in FIG. 1, data from the accelerometers are collected for a length of time, for example at least over several hours, or even over several days. Collecting data over a relatively long duration can ensure a favorable degree of accuracy. In this time, the fore-aft acceleration is measured using the fore-aft accelerometer $A_{FA}$ and processed in analysis block $20_{FA}$ to obtain an estimation of the "healthy" fore-aft frequency $f_{FA}$. Similarly, the side-to-side acceleration is measured using the side-to-side accelerometer $A_{S2S}$ and processed in analysis block $20_{S2S}$ to obtain an estimation of the "healthy" side-to-side frequency $f_{S2S}$.

The tower frequency $f_{FA}$ in the fore-aft direction $D_{FA}$ is generally slightly different from the tower frequency $f_{S2S}$ in the side-to-side direction $D_{S2S}$. The difference arises from various factors, while one main contributing factor is that the rotor blades have different stiffness in their flap-wise and edge-wise directions.

The estimated tower frequencies can be compensated based on operational parameters such as rotor speed, turbine output power, rotor thrust and pitch angle as these may slightly affect the frequency. Compensation can be done individually for the fore-aft frequency $f_{FA}$ and the side-to-side frequency $f_{S2S}$ since these may be affected to different extents by the different parameters.

The inventors have recognized that the difference between the fore-aft frequency $f_{FA}$ and the side-to-side frequency $f_{S2S}$ can be exploited to more reliably detect tower damage. To this end, instead of using only one control frequency—i.e. either the fore-aft frequency $f_{FA}$ or the side-to-side frequency $f_{S2S}$—as known from the conventional art, the inventive method includes a step of determining a working structural indicator value R using both the fore-aft frequency $f_{FA}$ and the side-to-side frequency $f_{S2S}$. In this exemplary embodiment, the working structural indicator value R computed in block 21 is a ratio of fore-aft frequency $f_{FA}$ to side-to-side frequency $f_{S2S}$. The structural indicator value R determined during the tower frequency measurements following installation and commissioning of the wind turbine is stored in a memory 22 as a reference structural indicator value $R_{ref}$. As long as the tower remains structurally sound, the working structural indicator value R should remain essentially identical to this reference structural indicator value $R_{ref}$. During the lifetime of the wind turbine, the working structural indicator value R is constantly computed and compared to the reference structural indicator value $R_{ref}$. If the working structural indicator value R differs from the reference structural indicator value $R_{ref}$ by more than a predefined threshold $\Delta_{OK}$, a fault report signal 230 is issued by a watchdog module 23 and passed to a suitable control module 24, for example to a control module 24 of the wind turbine controller or to a module 24 in a remote monitoring environment. Appropriate steps can then be taken, for example steps to shut down the wind turbine until damage to the tower structure can be repaired. A suitable value for the threshold $\Delta_{OK}$ can be based on data collected in the past for similar towers, and/or can be derived from simulations carried out for that type of tower structure.

Figure 3:
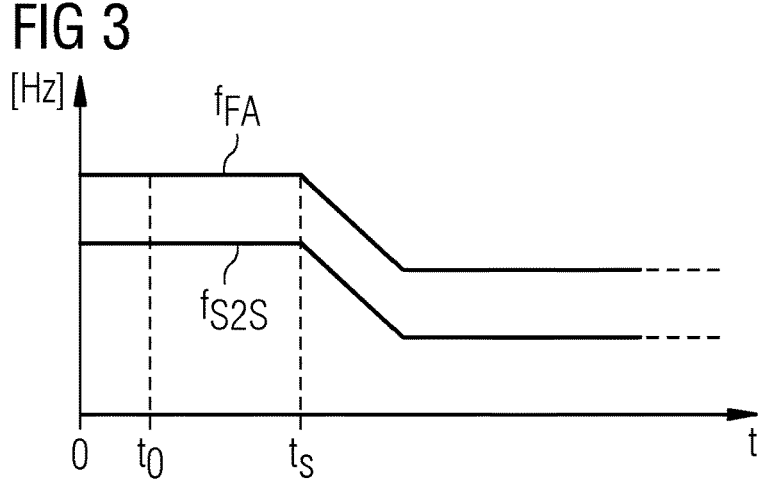
FIG. 3 shows a graph of fore-aft and side-to-side frequency frequencies over time.

FIG. 3 shows a graph of fore-aft and side-to-side frequencies $f_{FA}$, $f_{S2S}$ (Y-axis) over time (X-axis), for example in a time frame extending over several weeks, months or even years. The time scale extends from an initial time 0, representing the commissioning of the wind turbine. In a brief interval up to time $t_0$ following commissioning, a reference structural indicator value $R_{ref}$ is computed and stored in a memory as explained in FIG. 2 above.

Figure 4:
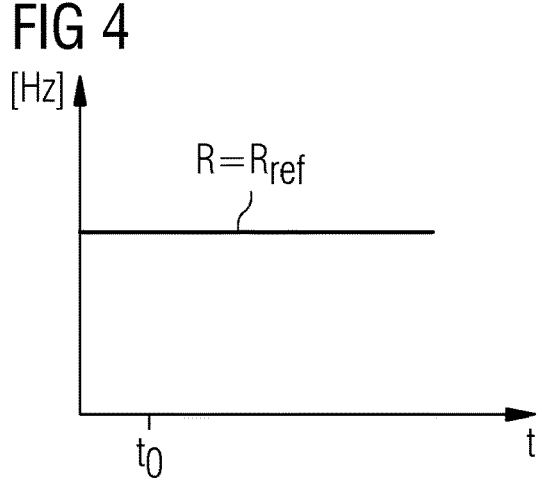
FIG. 4 shows the ratio of fore-aft frequency to side-to-side frequency over time.

In this exemplary embodiment, the curves indicate a possible alteration in frequency following a gradual change to the ground underneath the wind turbine. For example, the seabed may subside slightly around time $t_s$ in the region of an offshore wind turbine, so that the tower height is effectively slightly larger, and a tower oscillation frequency is therefore slightly lowered. However, since the altered tower height affects tower oscillation in all directions, the working structural indicator value R of fore-aft frequency $f_{FA}$ to side-to-side frequency $f_{S2S}$ will remain essentially constant, as indicated in FIG. 4.

Of course, a change to the underlying ground may result in an increase in tower oscillation frequency, but since the tower oscillation is affected equally in all directions, the working structural indicator value R, i.e. the ratio of fore-aft frequency $f_{FA}$ to side-to-side frequency $f_{S2S}$, will remain essentially unchanged.

Figure 5:
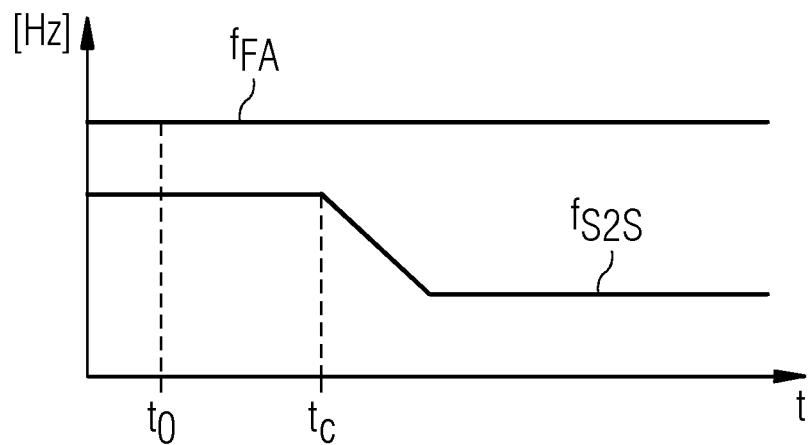
FIG. 5 shows a graph of fore-aft and side-to-side frequency frequencies.
Figure 6:
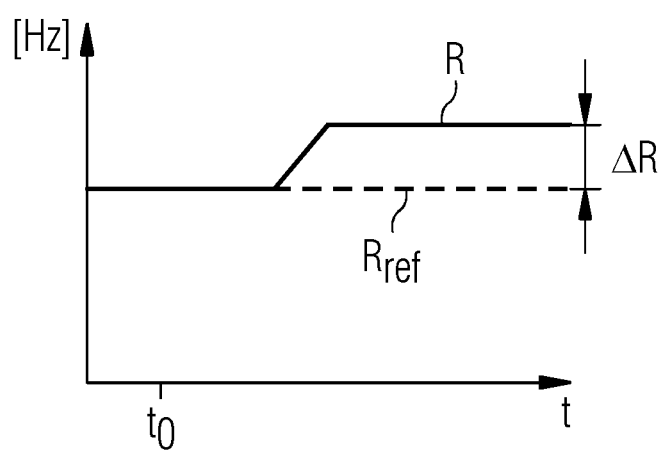
FIG. 6 shows the ratio of fore-aft frequency to side-to-side frequency over time.

FIG. 5 shows a graph of fore-aft and side-to-side frequencies $f_{FA}$, $f_{S2S}$ (Y-axis) over time (X-axis), again over a time frame that might extend over several weeks or months. The curves indicate a possible alteration in frequency following the development of a crack at time $t_c$ in the tower structure. A crack will have a more noticeable effect in some oscillation directions and will be less noticeable in other oscillation directions. FIG. 5 shows a situation in which the fore-aft frequency $f_{FA}$ is unaffected by the crack, but the side-to-side frequency $f_{S2S}$ clearly deviates from the expected value. In this case, the working structural indicator value R, i.e. the ratio of fore-aft frequency $f_{FA}$ to side-to-side frequency $f_{S2S}$ will exhibit a noticeable step, as indicated in FIG. 6, clearly deviating from the reference structural indicator value $R_{ref}$ (computed up to time $t_0$ during an interval following commissioning, as explained in FIG. 3 above). If this difference $\Delta_R$ exceeds an acceptable threshold $\Delta_{OK}$, a fault report signal is issued as explained in FIG. 2 above.

Although embodiments of the present invention has been disclosed in the form of embodiments and variations thereon, it will be understood that numerous additional modifications and variations could be made thereto without departing from the scope of embodiments of the invention. For example, acceleration and frequency could be evaluated in directions other than the fore-aft and side-side directions mentioned above. It may also be advantageous to interrupt measurement of the fore-aft and side-to-side frequencies during certain conditions that would deliver erroneous results, for example at certain rotational speeds of the aerodynamic rotor, during certain extreme pitch angles, etc.

Furthermore, the reference structural indicator value $R_{ref}$ can be recalculated in the event of major repairs or alterations to the wind turbine such as rotor blade replacement, or following any permanent change to the seabed conditions such as a level change.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of monitoring the structural integrity of a supporting structure of a wind turbine, comprising:
   determining a fore-aft tower oscillation frequency;
   determining a side-to-side tower oscillation frequency;
   computing a working structural indicator value from the fore-aft tower oscillation frequency and the side-to-side tower oscillation frequency, wherein the working structural indicator value is a ratio of the fore-aft tower oscillation frequency to the side-to-side tower oscillation frequency during monitoring of the wind turbine;
   comparing the working structural indicator value to a reference working structural indicator value;
   reporting a fault signal if the difference between the working structural indicator value and the reference structural indicator value exceeds a predefined threshold; and
   adjusting wind turbine operation parameters as a cautionary measure until the structural integrity of the supporting structure can be inspected.

2. The method according to claim 1, comprising a prior step of computing the reference structural indicator value over an interval following commissioning of the wind turbine.

3. The method according to claim 1, wherein the predefined threshold value is established on the basis of simulations carried out for that type of wind turbine.

4. The method according to claim 1, wherein the predefined threshold value is established on the basis of operation data collected for comparable wind turbines.

5. The method according to claim 1, wherein the fore-aft tower oscillation frequency is determined on the basis of data collected by a number of accelerometers arranged on a fore-aft axis of the wind turbine nacelle.

6. The method according to claim 1, wherein the side-to-side tower oscillation frequency is determined on the basis of data collected by a number of accelerometers arranged on a side-to-side axis of the wind turbine nacelle.

7. The method according to claim 1, comprising a step of yawing the nacelle while computing structural indicator values to identify the location of a tower structure fault.

8. The method according to claim 1, comprising a step of performing a fault verification procedure following the reporting of a fault signal.

9. A system for monitoring the structural integrity of a supporting structure of a wind turbine tower, comprising:
   a frequency determination module configured to determine a fore-aft tower oscillation frequency;
   a frequency determination module configured to determine a side-to-side tower oscillation frequency;
   a structural indicator value computation module configured to compute a structural indicator value from the fore-aft tower oscillation frequency and the side-to-side tower oscillation frequency, wherein the computed structural indicator value is a ratio of the fore-aft tower oscillation frequency to the side-to-side tower oscillation frequency during monitoring of the wind turbine;

a comparator module configured to compare the computed structural indicator value with a reference structural indicator value and to issue a fault report signal if the difference between the computed structural indicator value and the reference structural indicator value exceeds a predefined threshold; and a controller configured to adjust wind turbine operation parameters as a cautionary measure until the structural integrity of the supporting structure can be inspected.

10. A wind turbine comprising:

a supporting structure comprising a tower anchored to the ground by a foundation;

a nacelle mounted on top of the tower by a yaw assembly;

an aerodynamic rotor; and a system for monitoring the structural integrity of the supporting structure by:
  determining a fore-aft tower oscillation frequency;
  determining a side-to-side tower oscillation frequency;
  computing a working structural indicator value from the fore-aft tower oscillation frequency and the side-to-side tower oscillation frequency, wherein the computed working structural indicator value is a ratio of the fore-aft tower oscillation frequency to the side-to-side tower oscillation frequency during monitoring of the wind turbine;
  comparing the computed working structural indicator value to a reference working structural indicator value; and
  reporting a fault signal if the difference between the computed working structural indicator value and the reference structural indicator value exceeds a predefined threshold.

11. The wind turbine according to claim 10, wherein a fore-aft axis of the nacelle is parallel to the axis of rotation of the aerodynamic rotor.

12. The wind turbine according to claim 10, comprising a number of accelerometers arranged on a fore-aft axis of the nacelle, and a number of accelerometers arranged on a side-to-side axis of the nacelle.

13. A computer program product, comprising a computer readable hardware storage device having computer readable program code stored therein, said program code executable by a processor of a computer system to implement the method according to claim 1.

* * * * *